(12) United States Patent
Fluss

(10) Patent No.: US 6,304,578 B1
(45) Date of Patent: Oct. 16, 2001

(54) PACKET ROUTING AND QUEUING AT THE HEADEND OF SHARED DATA CHANNEL

(75) Inventor: Harold Shrage Fluss, West Orange, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/071,471

(22) Filed: May 1, 1998

(51) Int. Cl.[7] .................................................. H04L 12/28
(52) U.S. Cl. ........................ 370/413; 370/389; 370/235; 725/97
(58) Field of Search .................... 370/400–406, 370/411–420, 229–236, 468, 252–253; 725/96, 91, 97, 98, 104, 114, 119, 144, 126, 389, 392; 709/240, 235; 710/40

(56) References Cited

U.S. PATENT DOCUMENTS

| 5,764,645 | * | 6/1998 | Bernet et al. | 370/468 |
| 5,987,518 | * | 11/1999 | Gotwald | 709/230 |
| 6,124,878 | * | 9/2000 | Adams | 370/412 |

FOREIGN PATENT DOCUMENTS

WO 98/18289 A 4/1998 (WO).

OTHER PUBLICATIONS

Hernandez–Valencia E J: *Architectures for Broadband Residential IP Services Over CATV Networks*, IEEE Network, The Magazine of Computer Communications, vol. 11, No. 1, Jan. 1, 1997, pp. 36–43, XP000679054.

* cited by examiner

*Primary Examiner*—Wellington Chin
*Assistant Examiner*—Steven Nguyen
(74) *Attorney, Agent, or Firm*—Duane, Morris & Heckscher LLP

(57) ABSTRACT

A headend of a shared data channel receives data packets, each data packet being addressed to a user of the shared data channel. A buffer of the headend queues the data packets, and a router of the headend assigns high transmittal priority to data packets addressed to users who have more recently received a previous data packet and assigns low transmittal priority to data packets addressed to users who have relatively less recently received a previous data packet, wherein the low transmittal priority is a lower priority than the high transmittal priority.

18 Claims, 3 Drawing Sheets

100

300

310

PACKET ROUTING AND QUEUING AT THE HEADEND OF SHARED DATA CHANNEL

BACKGROUND OF THE INVENTION

1. Field of the Invention

The present invention relates to routing of data packets over a network and, in particular, to methods and apparatuses for improved packet routing and queuing at the headend of a shared data channel that services a number of users attached to the same shared data channel.

2. Description of the Related Art

Data packet communication on the Internet is dominated by traffic transported using the transport communication protocol/Internet protocol (TCP/IP) suite of protocols. The Internet protocol (IP) header of these packets contains information related to recipient and sender addresses and ports, packet size, and protocol encapsulated in the IP packet, such as transport communication protocol (TCP), user datagram protocol (UDP), or Internet control message protocol (ICMP). A data packet ("packet") is a finite set of data and associated control bits of a standard maximum size, having a predefined protocol and organization.

When a user (or client) requests a web page containing embedded images, there will then be a number of TCP/IP sessions, in which information is transmitted between the web page server and the client server using TCP/IP. The number of TCP/IP sessions is equal to one more than the embedded image total, since an initial request is required to download the HyperText Markup Language (HTML) file describing the page and its contents. Each of these interactions consists of three stages: connection establishment, data transfer, and connection termination. A connection is established using a "three way handshake," with a request from client to server, a response from the server, and an acknowledgment of the response. During this stage, the maximum packet size is agreed on. A document request then goes to the server, and the server responds. Each packet from server to client or client to server is acknowledged, either in its own packet, or "piggybacked" in a data packet. The closing of the connection requires an exchange of FIN commands, each one being acknowledged by the other end. A FIN command (for "finished") is a flag set in the packet header indicating that the sender is finished sending data.

Thus, in the first exchange, the client requests the HTML document describing the page. Upon receipt of this document, the web browser parses the document, and then initiates a series of connections for each of the embedded images (or any other type of file which may be part of the page). In typical current usage, all of these exchanges occur under software control; the user has only clicked on a hypertext reference or entered a uniform resource locator (URL). As a result, these sessions will be set up and torn down faster than if they were user-initiated. Only the data packets from the server to the client that contain the document and the images are likely to be large; any packets other than data packets, e.g. control packets, will be relatively small, consisting of little more than the TCP/IP header and sometimes a small amount of control data. Further background information on TCP and IP may be found in W. R. Stevens, *TCP/IP Illustrated*, Vol. 1 (Addison-Wesley, 1994).

When transmitting data packets over a network such as the Internet, a last headend (or central office, point of presence, corporate gateway, or the like) is typically reached, which services a number of users on a data channel, with a headend router. Such data channels having a single headend serving a number of users are sometimes referred to as shared data channels. A headend router is at the "headend" of a given shared channel and serves as the communications interface with external networks. In this capacity, a headend router routes data packets received to the appropriate user and also prioritizes and schedules data packets for routing to users. After a data packet is received by the headend, the headend router then passes the data onto the appropriate user on the shared channel. A bottleneck can occur at this point if the available bandwidth is insufficient to satisfy the demand (e.g., transmission bandwidth on the channel itself or transmission and/or processing bandwidth of the router or headend), resulting in queuing of "downstream" packets (i.e., packets destined for a user of the shared channel serviced by the headend).

For example, a plurality of users may be attached to a given headend, which itself is coupled to the Internet. One of the users may request a HyperText Markup Language (HTML) document (i.e., web page) from a web server coupled to the Internet. This document may be routed through the Internet in the form of packets, and ultimately delivered to the user's own headend. The headend then typically immediately routes the packets to the recipient/user with the headend router, if possible, or queues them in a buffer (typically, a first-in, first out (FIFO) buffer) if other packets are currently occupying the shared channel.

The two parameters that characterize this queuing of packets intended for given recipients are latency (the time between document request and the beginning of receipt) and throughput (the rate at which the document arrives once the first packet of the document has been received). As the buffer feeding the shared channel gets more full, it takes longer for a packet to be processed, and if either the buffer overflows or the packet is not received by a user before being timed out, packets need to be retransmitted. As a result, effective throughput will drop below what the remote server and the Internet are capable of delivering. Further discussion of queuing and related issues may be found in L. Kleinrock, *Queuing Systems, Vol. II: Computer Applications* (John Wiley & Sons, 1976); N. K. Jaiswal, *Priority Queues* (Academic Press, 1968); and V. N. Padmanabhan & J. C. Mogul, *Improving HTTP Latency* (presented at the $2^{nd}$ World Wide Web Conference, Chicago, 1994).

Thus, in many networks such as the currently-configured world-wide web (WWW) of the Internet, a user is faced by highly variable latency and throughput, due to the queuing behavior caused by the unavoidable bandwidth limitations of such networks and distribution systems. These problems are manifest even as higher rate services such as cable modems and high speed digital subscriber loops are being introduced. For example, after a user requests a document or other data (for example, by clicking on the URL or hyperlink on a given web page using a web browser), it may take a first time delay before the connection to the web server sending the requested document is acknowledged. After the connection is acknowledged (typically by an appropriate message being displayed on the user's browser), a second time delay elapses before the first packets of data for the document begin to be delivered to the user and thus displayed. Once document delivery begins and the document begins to display, it may take some time before the entire document and its contents are painted on the screen, and this may occur in jerky, choppy, stop-and-go fashion, which may be annoying and frustrating to users who see part of a picture, for example, but are unable to see the complete picture for a substantial length of time, due to long periods between data bursts.

It may be difficult to justify the premium price to be charged to some users, if users are still dissatisfied with this highly variable latency and throughput at certain high-traffic times. For this and other reasons, therefore, it is desirable to improve the perceived performance.

SUMMARY

In the present invention, the data packet queuing and routing behavior of the headend of a shared data channel is modified to improve document delivery performance perceived by users of the shared data channel. Although transmission bandwidth constraints may make improvements of absolute performance impractical, improvements in perceived performance are advantageous since, for example, such improvements can improve comfort and ease of use of a given service, reduce frustration and dissatisfaction, and the like. The term "headend" is used herein to refer to a headend, central office, point of presence, corporate gateway, or the like.

In accordance with the present invention, a headend of a shared data channel receives data packets, each data packet being addressed to a user of the shared data channel. A buffer of the headend queues the data packets, and a router of the headend assigns high transmittal priority to data packets addressed to users who have more recently received a previous data packet and assigns low transmittal priority to data packets addressed to users who have relatively less recently received a previous data packet, wherein the low transmittal priority is a lower priority than the high transmittal priority.

DESCRIPTION OF THE PREFERRED EMBODIMENT

Latency Tradeoff for Improved Throughput

The present invention addresses the aforementioned problems and improves perceived performance, by trading latency at the last router (i.e., the headend router that delivers received packets to the specified user attached to a shared data channel controlled by the headend) for improved throughput. Thus, by utilizing the present invention, a user may wait a little longer for the start of delivery of a document or group of documents (such as a web page), but he will get it faster once it begins to display. The present invention recognizes that, since the additional latency at this last hop through the Internet is a small fraction of the total latency that is commonly incurred, the extra latency incurred is hardly noticeable, if at all. However, the increased throughput attained makes the reception of documents a more satisfying experience for the user. The term "headend" is used generally herein to refer to the unit or node coupled to a data channel which receives and routes data packets addressed to users of the data channel, and includes equipment such as a headend, central office, point of presence, corporate gateway, and the like.

As an example, in a headend having a router configured without the benefit of the present invention, a user may click on a hyperlink to request a web page from a web server that serves up data requested from the web page, where the web page itself contains a variety of embedded text, images, and so forth. It may take five seconds before a TCP/IP session is established between the headend's router and the web server and for this to be acknowledged to the user. Because of latency across the Internet itself and queuing at the headend router, it may take another thirty seconds before delivery of the data packets representing the document to the requesting user's screen is initiated. The document may then take another sixty seconds to be completely received and displayed. By implementing the present invention, the user may have to wait a longer time before the document begins to display, but it will take less than sixty seconds to display the entire document.

The present invention may be implemented by suitably configuring the headend of a given shared data channel to implement the above-described tradeoffs. Further exemplary embodiments and implementations of the present invention are described below.

Cable Modem Implementation

Figure 1:
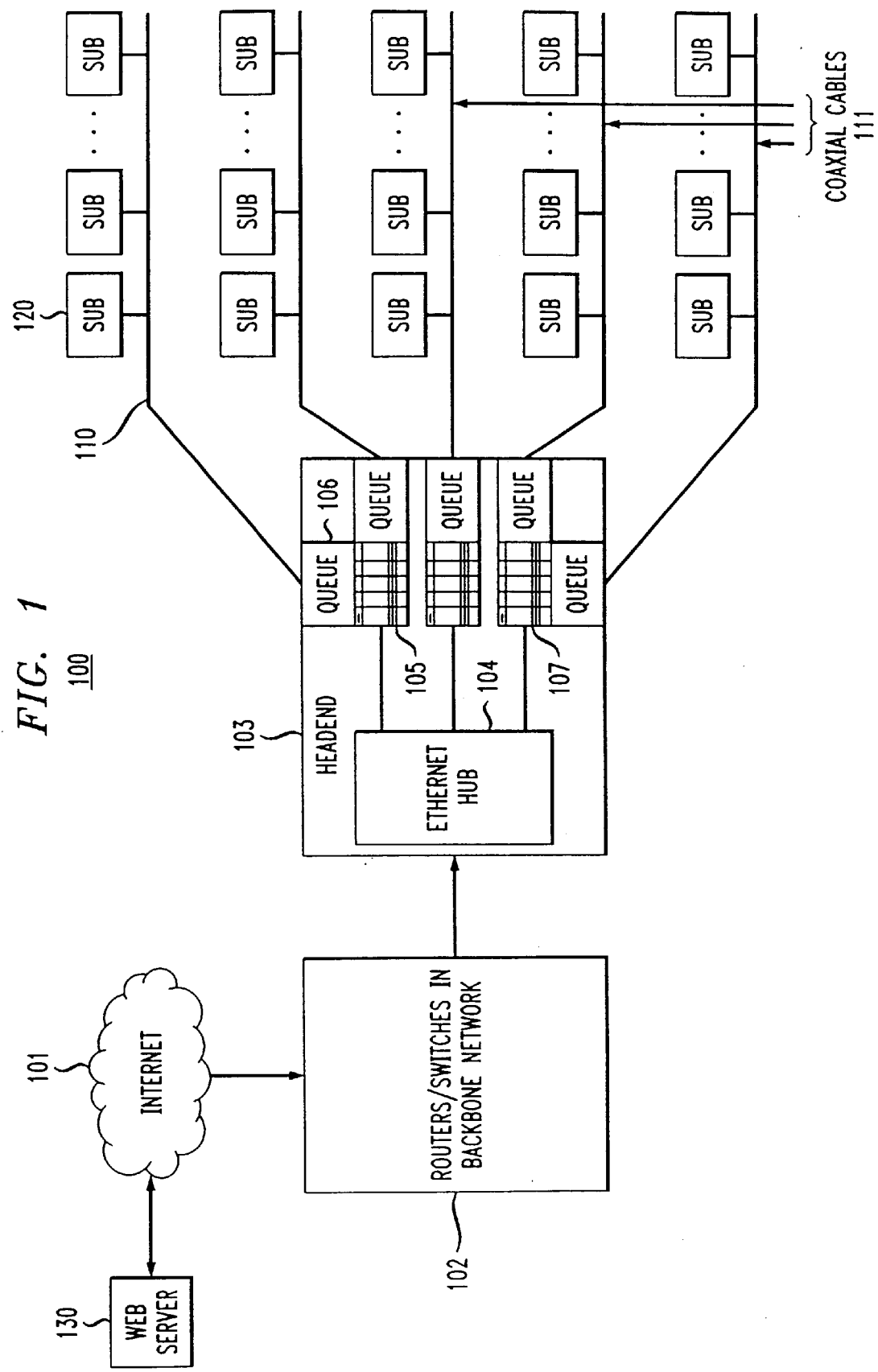
FIG. 1 is a block diagram of a cable modem system architecture, in accordance with an embodiment of the present invention.

FIG. 1 is a block diagram of a cable modem system 100 architecture, in accordance with an embodiment of the present invention. System 100 contains a headend 103, which itself contains an Ethernet hub (or switch) 104. Headend 103 is coupled to router 102 in the backbone network of the ISP, which is itself coupled to the Internet. Router 102, which also contains various switches and other components, routes data packets received from Internet 101 to the appropriate headend, such as headend 103. The backbone network is the network that provides data communication for the ISP. The Internet is coupled to a variety of possible packet data sources, such as web server 130.

Headend 103 supports a plurality of shared data channels, each utilizing a coaxial cable, such as shared channel 110. Thus, for example, one set of users or subscribers, such as user 120, uses shared channel 110, which is serviced by queue 106 of router 105. Queue 106 is a buffer which stores a number of queued data packets, preferably in FIFO order, which have not yet been routed to particular users of shared channel 110. Router 105 routes queued data packets to the appropriate users of shared channel 110, and may be implemented by cable modem terminating equipment, such as the Motorola Cable Router (for further information, see http://www.mot.com), which provides routing and other coaxial cable data management functions, or may be another type of router. Each router such as router 105 controls bandwidth and spectrum usage in one or more coaxial cable plant (or hybrid fiber/coax plant), manages the attached cable modems, and connects to a network interface in the headend, such as Ethernet hub 104. Ethernet hub 104 provides data communication interfacing services between queues and routers in headend 103 and the ISP's backbone network.

Downstream traffic (i.e., data packets addressed to users of one of the shared channels serviced by headend 103) which exceeds the capacity of the cable data channel 110 are queued in the headend's queues, e.g. queue 106. The headend instructs each router such as router 105 what type of priority scheme to apply to the data packets queued in the queues. The priority scheme is used to determine which queued data packets are to be next transmitted to a user of the shared data channel when the channel is available, and may be as simple as FIFO or more complicated. The priority scheme used in the present invention is described in further detail below. Each router 105 can service a number of cable data channels, each having its own packet data queue.

The present invention may be implemented by modifying the queuing behavior of router 105, as described in further detail below with respect to the methods of FIGS. 3 and 4.

xDSL Implementation

Figure 2:
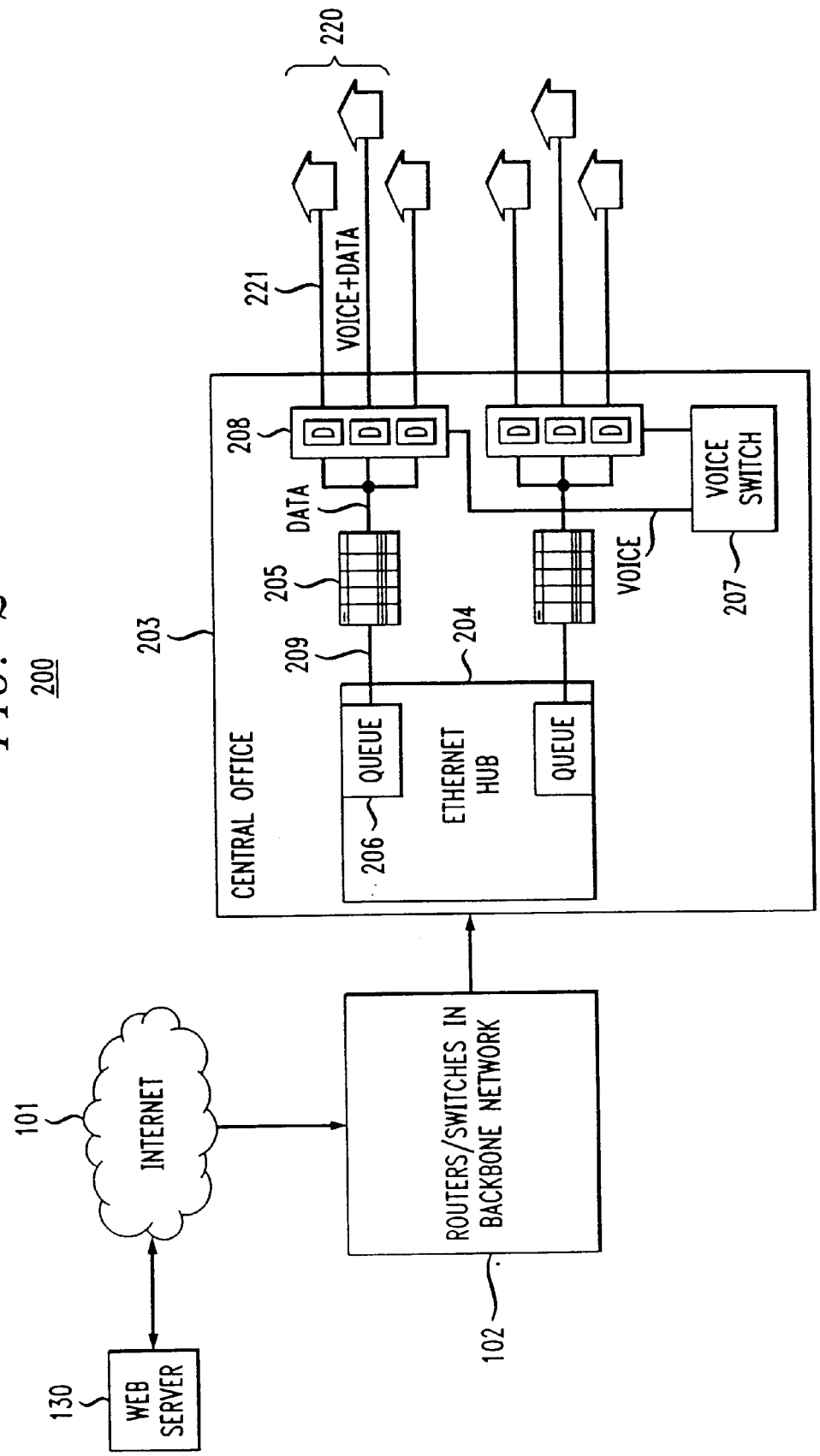
FIG. 2 is a block diagram of an xDSL system architecture, in accordance with an embodiment of the present invention.

The present invention may also be usefully employed in other shared data channel architectures, such as the xDSL data architecture. As will be appreciated, "xDSL" refers to all members of the digital subscriber loop (DSL) family, such as asymmetric DSL (ADSL), high-speed DSL (HDSL), symmetric DSL (SDSL), very-high-speed DSL (VDSL), and so forth. Referring now to FIG. 2, there is shown a block diagram of an xDSL system 200 architecture, in accordance with an embodiment of the present invention. The headend of system 200 is central office 203, which is also coupled to Internet 101 through routers 102 in the backbone network of the ISP. Both the headend 103 of system 100 and central office 203 of system 200 may be considered to be headends. Again, the Internet may be coupled to a data source such as web server 130.

Central office 203 comprises Ethernet hub (or switch) 204, which itself provides a number of queues, such as queue 206, for each of the DSL channels that are serviced thereby. Central office 203 also includes a bank of data modems or a DSL access multiplexer (DSLAM) 205, and corresponding diplexers such as diplexer 208. As will be appreciated, a diplexer is a passive device, also known as a splitter, which in the downstream direction (i.e., towards subscribers of the DSL) combines the frequencies containing the voice signal with the frequencies containing the data signals onto a single pair of wires (or "loop"), and which in the upstream direction (i.e., from subscribers) separates the higher frequencies containing the data from the lower frequencies containing the voice. In this way, the signal processing that is needed to recover the bits that are sent is made easier, allowing higher data rates. In one embodiment, central office 203 also utilizes a voice switch 207. The purpose of DSLAM 205, as will be appreciated by those skilled in the art, is to combine or consolidate the bandwidths of access loops 221 from central office 203, onto a more efficiently utilized link.

In the xDSL family of DSLs between central office 203 and subscribers (users), such as subscribers 220, voice and data may be carried simultaneously on copper pairs such as copper pair 221, and separated at central office 203. As illustrated, there are typically a number of subscribers on each shared data channel, such as subscribers 220, which utilize a shared data channel (DSL) serviced by queue 206, through DSLAM 205. Thus, for a given channel, a queue such as queue 206 is maintained by Ethernet hub 204, to deliver data through a bank of DSLAM 205, which terminates data connections between DSLAM 205 and a given subscriber, and where the data streams are also multiplexed (xDSL data equipment is known as a DSLAM, for DSL Access Multiplexer).

Still referring to FIG. 2, a bottleneck may occur upstream of DSLAM 205, i.e. before the data packets reach DSLAM 205, at queue 206, if the downstream data rate is greater than the capacity of the Ethernet link 209 between Ethernet hub 206 and DSLAM 205. The present invention is therefore implemented, in this embodiment, by modifying or configuring the queuing behavior of Ethernet hub 204, as described in further detail below with respect to the methods of FIGS. 3 and 4.

Flow Diagram of Invention

Figure 3:
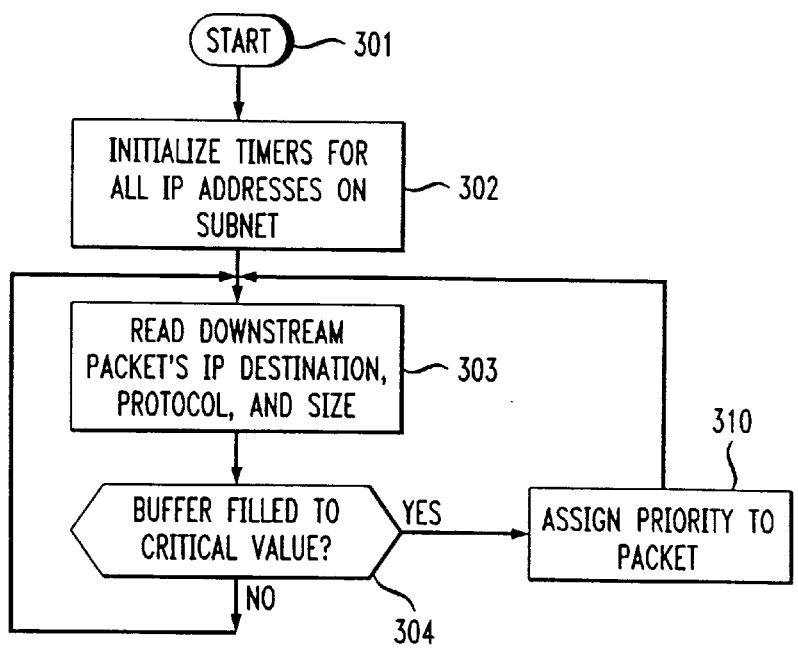
FIG. 3 is a flowchart illustrating the method of operation of the headend of the systems of FIGS. 1 and 2, in accordance with an embodiment of the present invention.
Figure 4:
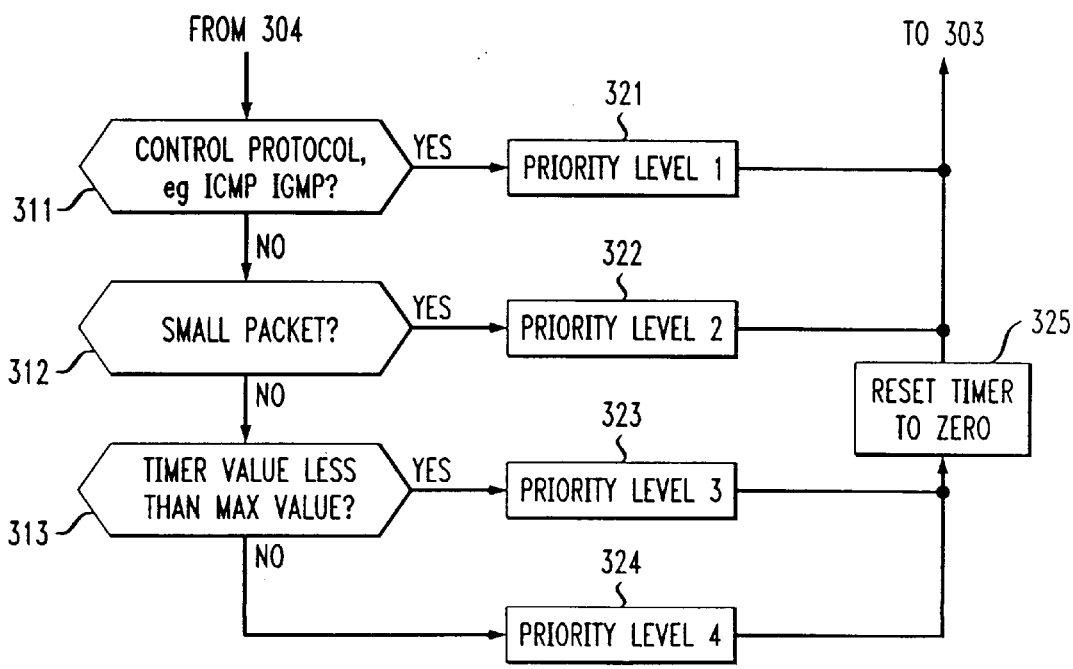
FIG. 4 is a flowchart illustrating in further detail the priority assignment method used by the method of FIG. 3, in accordance with an embodiment of the present invention.

Given a headend having a router that uses a queue to deliver data packets to specified users of a shared data channel controlled by the router (such as systems 100 or 200 described above), the present invention may be implemented, in one embodiment, as shown in FIGS. 3 and 4. FIGS. 1 and 2 are provided herein only as illustrative examples; other architectures with queuing equipment interfaced to a packet switching network such as the Internet can also be used.

Referring now to FIG. 3, there is shown a flowchart 300 illustrating the method of operation of the headend of systems 100 and 200 of FIGS. 1 and 2, in accordance with an embodiment of the present invention. FIG. 4 is a flowchart illustrating in further detail the priority assignment step 310 used in method 300 of FIG. 3, in accordance with an embodiment of the present invention.

The current version of the Internet Protocol, IPv4, does not take advantage of prioritization of packets. In this protocol, each packet has an IPv4 header, payload, and trailer sections. The IPv4 header has an 8 bit ToS (Type of Service) field in which the first 3 bits are a precedence field that is ignored today. The next 4 bits may be set to 1 for "minimize delay", "maximize throughput", "maximize reliability", and "minimize monetary cost", respectively. The $8^{th}$ bit is not used. The 4 ToS bits are set by application type, and are used in making routing decisions, as a packet is routed across routers in the Internet. Several techniques, such as RSVP (ReSerVation Protocol), have been suggested to allow the reservation of resources for a particular data flow between a given port at the source and a port at the destination. RSVP is a public proposal from the Internet Engineering Task Force (IETF), RFC2205, "Resource ReSerVation Protocol (RSVP)—Version 1 Functional Specification," R. Braden, Ed., L. Zhang, S. Berson, S. Herzog, S. Jamin (September 1997). The reservation of resources creates two categories of packets: high priority, with guaranteed quality of service (QoS), and all other packets. Within the Internet routers, these priority packets would have precedence over the other traffic. In the next generation of the Internet Protocol (IPng or IPv6) there will be priority choices, but again based on a specific higher-level application and for a specific destination/port and source/port, i.e. a flow.

As described above, in the present invention downstream packet priorities (i.e., packets not yet delivered "downstream" from the headend to the user on the shared channel) are set at the central office or headend only, instead of "globally" assigning a general priority to the packet that must be respected by all nodes, routers, and the like that the packet is handled by throughout its entire transmission across various networks. Additionally, this priority can depend on the protocol that the IP is encapsulating, the time since the destination address has received a packet, and the size of the packet.

Referring once more to FIG. 3, in step 301 the process starts. The headend maintains timers for all IP addresses on the shared data channel. For example, in system 100, router 105 maintains timers for each user IP address for each shared data channel managed by router 105. In step 302, the timers for all IP addresses on the shared data channel are initialized. Each timer is initially set to its maximum value. The timers are used to determine the time elapsed between consecutive packet arrivals to a given user. This allows the router which implements method 300 to determine whether a given user has recently received packets (see discussion of step 313 below).

In step 303, the router (e.g., router 105 of headend 103 of system 100) starts reading the header of incoming downstream IP packets to determine the downstream packet's IP destination address, the protocol the packet is encapsulating, and the packet size (in conventional TCP/IP systems, the header must be examined to determine at least the destination address). In step 304, if the buffer for the queue for the data channel for which the packet is addressed is not filled to a given critical value, then the packet is substantially immediately transmitted according to standard techniques and step 303 is repeated. However, if the buffer is filled to a certain critical value, then step 310 assigns a new priority to the packet, i.e. one different than simple FIFO priority, which priority is used to determine which order to transmit packets in the queue. This critical value may be selected empirically by the headend owner, based on perceived performance improvement and other factors. For example, a critical value corresponding to 60% of the shared data channel's maximum capacity may be selected by empirical testing. Once the packet has a priority assigned, the process continues and the next packet is read in step 303.

Referring now to FIG. 4, four priority levels are utilized, with level one being the highest priority. These priority levels are assigned as follows. The priority assignment of the present invention assigns highest priority to control protocol packets, i.e. packets that do not contain data but contain control information. As explained further below, if a packet cannot be explicitly identified as a control packet and thus assigned priority level 1, then the size of the packet is evaluated. Recognizing that sustained data flows are usually comprised of the largest packets, since they are full of as much data "payload" as possible, then a packet which is relatively "small" in comparison to the largest size packets is likely to be a special non-data packet that is being used to either set up or tear down a connection, or to acknowledge receipt of data packets. Various criteria may be utilized to determine when a packet is to be classified as "small" or not, as described in further detail below. These "small" packets that presumably are engaged in these activities should be assigned a priority above that of packets of a sustained data flow, since they are more "important" than normal data packets, because setting up connections gives a user the feedback that contact has been made with the remote web server, tearing down connections frees up resources, and acknowledgments are needed for the smooth flow of data packets.

As between larger (i.e. data) packets themselves, higher priority (level 3) is assigned to those packets for whom the user's timers are less than a maximum value, i.e., to those who have recently received a packet and are presumptively in the middle of a download of a document. The timer is set to zero for any user receiving a large packet so that they will have a higher priority for their next large packet. The timer then runs until reset, or until it reaches its maximum value. This priority assignment and discrimination between large (presumptively data) packets tends to improve throughput at the expense of increased latency. In other words, the large data packets that are destined to go to a user who has recently received a data packet will then have a higher priority than those destined for someone who has not received data recently and therefore is not in the middle of viewing a web page. This latter person can wait a little longer; in this way we trade off additional latency for a faster throughput once a connection is made and data is flowing. These priority assignment steps are explained in more detail as follows.

Once step 310 is selected to assign priority to a packet, it is first determined whether the packet is a control protocol packet, such as ICMP (Internet Control Message Protocol), IGMP (Internet Group Management Protocol) (steps 311). If so, the packet is assigned priority level 1, the highest priority (step 321). The assignment of priority level to a given packet may be implemented in various ways depending, for example, upon the router manufacturer's design choice. For example, a given priority level may be assigned to a packet by modifying the header and/or trailer sections. Alternatively, a prepended or postpended byte may be employed, which indicates the priority level assigned to the packet to which the byte is prepended or postpended. In still further embodiments, the priority assigned to a packet may be indicated by a setting in a software table that manages the routing of packets.

Next, by noting that data-containing packets are generally large (near the allowable maximum size, which is typically 0.5 kbytes), packets that are smaller than some threshold may be considered likely to contain control information either to establish or terminate connections or perhaps to acknowledge receipt of packets (step 312). This threshold may be arbitrarily set or determined through empirical use. For example, any packet having a size greater than or equal to 80% of the maximum allowable packet size may be presumed to be a data packet, with other, shorter packets presumed to be control packets. Thus, these shorter, control packets thus are assigned the next higher priority, priority level 2 (step 322). Finally, of the longer packets, those that are going to an IP address (i.e. a user) that has received a packet in less than some defined critical time are given higher priority (priority level 3) than those longer packets going to destinations that have not received packets in less than this time, which are assigned priority level 4 (steps 313, 323, and 324).

After assigning either priority 3 or 4 to a long (presumably data) packet, the timer for the IP address of the packet's destination is reset to zero (step 325), to indicate that the corresponding subscriber has just recently received data. This user will then tend to have higher priority for "large" data packets (i.e., priority level 3 ) than other users, which causes the present invention to be implemented. In other words, those inactive destinations that have not received packets wait a little longer than if the invention were not implemented, while those that are active will continue to receive data. Thus, once data reception starts, there is no major interruption or gap in the incoming data flow. This has the overall effect of increasing "perceived throughput," and therefore provides an implementation of the tradeoff of the present invention.

The present invention can also be embodied in the form of computer-implemented processes and apparatuses for practicing those processes. The present invention can also be embodied in the form of computer program code embodied in tangible media, such as floppy diskettes, CD-ROMs, hard drives, or any other computer-readable storage medium, wherein, when the computer program code is loaded into and executed by a computer (such as a computer element of a headend or router), the computer becomes an apparatus for practicing the invention. The present invention can also be embodied in the form of computer program code loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a future general-purpose microprocessor sufficient to carry out the present invention, the computer program code segments configure the microprocessor to create specific logic circuits in the headend or router thereof to carry out the desired process.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A headend of a shared data channel for delivering data packets over the shared data channel, the headend comprising:

(a) a buffer for receiving and queuing data packets addressed to users of the shared data channel; and (b) a router for routing queued data packets to the users in accordance with a transmittal priority associated with each data packet, wherein the router assigns a high transmittal priority to data packets addressed to users who have more recently received a previous data packet and the router assigns a low transmittal priority to data packets addressed to users who have relatively less recently received a previous data packet, with respect to the previous data packet that was more recently received, wherein the low transmittal priority is a lower priority than the high transmittal priority.

2. The headend of claim 1, wherein the router assigns the high transmittal priority to data packets addressed to users who have received a most recent previous data packet within a user defined critical time period.

3. The headend of claim 1, wherein the router comprises:

(1) means for determining, for each data packet, the protocol the data packet is encapsulating, the time elapsed since the user to which the data packet is addressed has received a most recent previous data packet, and the size of the data packet; and (2) means for assigning a transmittal priority to the data packet in accordance with said protocol determinations.

4. The headend of claim 3, wherein said means for assigning comprises means for assigning a highest transmittal priority to control protocol packets, wherein said highest transmittal priority is higher than the high transmittal priority.

5. The headend of claim 1, wherein the router comprises:

(1) a timer for each user for tracking the time elapsed since each user has received a data packet;

(2) means for determining, for each data packet, the protocol the data packet is encapsulating, the time elapsed since the user to which the data packet is addressed has received a data packet, and the size of the data packet;

(3) means for assigning a highest transmittal priority (level 1) to the data packet if the data packet is a control protocol packet;

(4) means for assigning a level 2 transmittal priority to the data packet if the data packet is not determined to be a control protocol packet and if the size of the data packet is less than a defined packet size;

(5) means for assigning a level 3 transmittal priority to the data packet if the data packet is not determined to be a control protocol packet, the size of the data packet is not less than a defined packet size, and the timer for the user to which the data packet nis addressed is less than a user defined time value; and (6) means for assigning a lowest transmittal priority (level 4) to the data packet otherwise.

6. The headend of claim 1, further comprising means for assigning a highest transmittal priority to control protocol packets, wherein said highest transmittal priority is higher than the high transmittal priority.

7. The headend of claim 1, further comprising:

(d) means for determining whether the buffer is filled to more than a defined threshold value, wherein the router assigns a high transmittal priority to data packets addressed to users who have more recently received a previous data packet and the router assigns a low transmittal priority to data packets addressed to users who have relatively less recently received a previous data packet, with respect to the previous data packet that was more recently received, wherein the low transmittal priority is a lower priority than the high transmittal priority, only if the buffer is filled to more than the defined threshold value.

8. The headend of claim 1, wherein the data packets are received from a web server coupled to the headend via the Internet.

9. The headend of claim 1, wherein the headend is a headend of a cable modem system.

10. The headend of claim 1, wherein the headend is a central office of a digital subscriber loop system.

11. In a headend of a shared data channel, a method for routing data packets over the shared data channel, the method comprising the steps of:

(a) receiving data packets, each data packet being addressed to a user of the shared data channel; and (b) assigning high transmittal priority to data packets addressed to users who have more recently received a previous data packet and assigning low transmittal priority to data packets addressed to users who have relatively less recently received a previous data packet, with respect to the previous data packet that was more recently received, wherein the low transmittal priority is a lower priority than the high transmittal priority.

12. The method of claim 11, wherein step (b) comprises the step of assigning the high transmittal priority to data packets addressed to users who have received a most recent previous data packet within a user defined critical time period.

13. The method of claim 11, wherein step (b) comprises the steps of:

(1) determining, for each data packet, the protocol the data packet is encapsulating, the time elapsed since the user to which the data packet is addressed has received a most recent previous data packet, and the size of the data packet; and (2) assigning a transmittal priority to the data packet in accordance with the determining of step (b)(1).

14. The method of claim 13, wherein step (b)(1) comprises the step of assigning a highest transmittal priority to control protocol packets, wherein said highest transmittal priority is higher than the high transmittal priority assigned to any data packets.

15. The method of claim 11, wherein step (b) comprises the steps of:

(1) tracking the time elapsed since each user has received a data packet with a timer for each user;

(2) determining, for each data packet, the protocol the data packet is encapsulating, the time elapsed since the user to which the data packet is addressed has received a data packet, and the size of the data packet;

(3) assigning a highest transmittal priority (level 1) to the data packet if the data packet is a control protocol packet;

(4) assigning a level 2 transmittal priority to the data packet if the data packet is not determined to be a control protocol packet and if the size of the data packet is less than a defined packet size;

(5) assigning a level 3 transmittal priority to the data packet if the data packet is not determined to be a control protocol packet, the size of the data packet is not less than a defined packet size, and the timer for the user to which the data packet is addressed is less than a user defined time value; and (6) assigning a lowest transmittal priority (level 4) to the data packet otherwise.

16. The method of claim 11, wherein step (b) comprises the step of assigning a highest transmittal priority to control protocol packets, wherein said highest transmittal priority is higher than the high transmittal priority.

17. The method of claim 11, further comprising the step of:

(c) queuing data packets addressed to users of the shared data channel with a buffer.

18. The method of claim 17, further comprising the step of:

(d) determining whether the buffer is filled to more than a predetermined threshold value and performing the assigning of step (b) only if the buffer is filled to more than the predetermined threshold value.

* * * * *